United States Patent
Isenhour et al.

(10) Patent No.: US 10,620,388 B2
(45) Date of Patent: Apr. 14, 2020

(54) FIBER OPTIC CABLE ASSEMBLIES FOR TERMINATING A FIBER OPTIC CABLE AND METHODS OF MAKING THE SAME

(71) Applicant: Corning Optical Communications LLC, Hickory, NC (US)

(72) Inventors: Micah Colen Isenhour, Lincolnton, NC (US); Alvin John McDonald, Lenoir, NC (US); Hieu Vinh Tran, Charlotte, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 485 days.

(21) Appl. No.: 15/332,579

(22) Filed: Oct. 24, 2016

(65) Prior Publication Data

US 2017/0038538 A1    Feb. 9, 2017

Related U.S. Application Data

(63) Continuation of application No. PCT/US2015/030060, filed on May 11, 2015.
(Continued)

(51) Int. Cl.
*H01R 43/00* (2006.01)
*G02B 6/38* (2006.01)
*G02B 6/44* (2006.01)

(52) U.S. Cl.
CPC ......... *G02B 6/3889* (2013.01); *G02B 6/3887* (2013.01); *G02B 6/443* (2013.01);
(Continued)

(58) Field of Classification Search
CPC .......... G02B 6/46; G02B 6/44; G02B 6/4401; G02B 6/02; G02B 6/04; G02B 6/3887;
(Continued)

(56) References Cited

U.S. PATENT DOCUMENTS 5,478,970 A * 12/1995 Lawler .................. E21B 17/023
174/74 R
6,899,467 B2    5/2005 McDonald et al.
(Continued)

FOREIGN PATENT DOCUMENTS

EP    0526108 A2    2/1993
EP    2053433 A1    4/2009
(Continued)

OTHER PUBLICATIONS

US 7,481,586 B2, 01/2009, Yu et al. (withdrawn)
Patent Cooperation Treaty, International Search Report for PCT/US2015/030060, dated Sep. 8, 2015, 4 pages.

*Primary Examiner* — Thiem D Phan
(74) *Attorney, Agent, or Firm* — Michael E. Carroll, Jr.

(57) ABSTRACT

A fiber optic cable assembly for terminating a cable using an interior seal component in a passage of a retention body and methods for making the same. The interior seal component inhibits a bonding material from passing through to unintended portions of the retention body, and also serves to position the cable within the retention body during termination. Embodiments may include an optional end seal for inhibiting the bonding agent from escaping the retention body.

24 Claims, 11 Drawing Sheets

Related U.S. Application Data

(60) Provisional application No. 61/991,974, filed on May 12, 2014.

(52) U.S. Cl.
CPC ......... *G02B 6/4471* (2013.01); *G02B 6/4483* (2013.01); *G02B 6/3821* (2013.01); *Y10T 29/49174* (2015.01)

(58) Field of Classification Search
CPC ...... G02B 6/3861; G02B 6/443; G02B 6/381; G02B 6/3869; G02B 6/4483; Y10T 29/49174; Y10T 29/49908; Y10T 156/1798; Y10T 29/49826; H01R 13/5219
USPC ................ 29/857, 825, 854, 855, 862, 874
See application file for complete search history.

(56) References Cited

U.S. PATENT DOCUMENTS

| | | |
|---|---|---|
| 7,090,406 B2 | 8/2006 | Melton et al. |
| 7,090,407 B2 | 8/2006 | Melton et al. |
| 7,111,990 B2 | 9/2006 | Melton et al. |
| 7,113,679 B2 | 9/2006 | Melton et al. |
| 7,137,742 B2 | 11/2006 | Theuerkorn et al. |
| 7,244,066 B2 | 7/2007 | Theuerkorn |
| 7,264,402 B2 | 9/2007 | Theuerkorn et al. |
| 7,572,065 B2 | 8/2009 | Lu et al. |
| 7,654,747 B2 | 2/2010 | Theuerkorn et al. |
| 7,677,814 B2 | 3/2010 | Lu et al. |
| 7,744,288 B2 | 6/2010 | Lu et al. |
| 7,785,019 B2 | 8/2010 | Lewallen et al. |
| 7,942,590 B2 | 5/2011 | Lu et al. |
| 8,272,792 B2 | 9/2012 | Coleman et al. |
| 2005/0041928 A1* | 2/2005 | Zimmel ............... G02B 6/3825 385/55 |
| 2006/0115229 A1 | 6/2006 | Shimazu et al. |
| 2007/0140622 A1* | 6/2007 | Kenison ................ E21B 17/023 385/76 |
| 2008/0310798 A1 | 12/2008 | Cody et al. |
| 2012/0315001 A1* | 12/2012 | Beck .................... G02B 6/3861 385/78 |

FOREIGN PATENT DOCUMENTS

| | | |
|---|---|---|
| GB | 2013922 A | 8/1979 |
| WO | 2010039837 A1 | 4/2010 |
| WO | 2010102081 A2 | 9/2010 |
| WO | 2013005855 A1 | 1/2013 |
| WO | 2013019465 A1 | 2/2013 |
| WO | 2013025855 | 2/2013 |
| WO | 2014063154 A1 | 4/2014 |

* cited by examiner

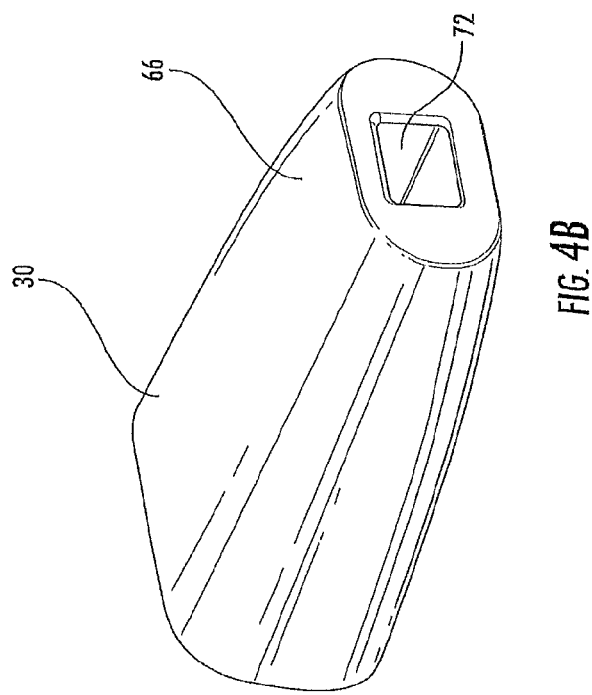
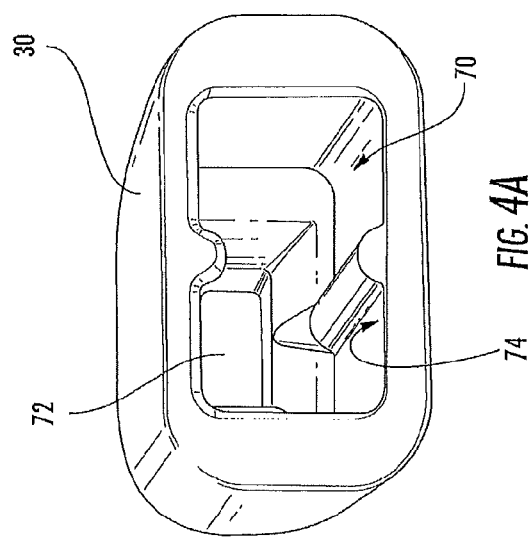

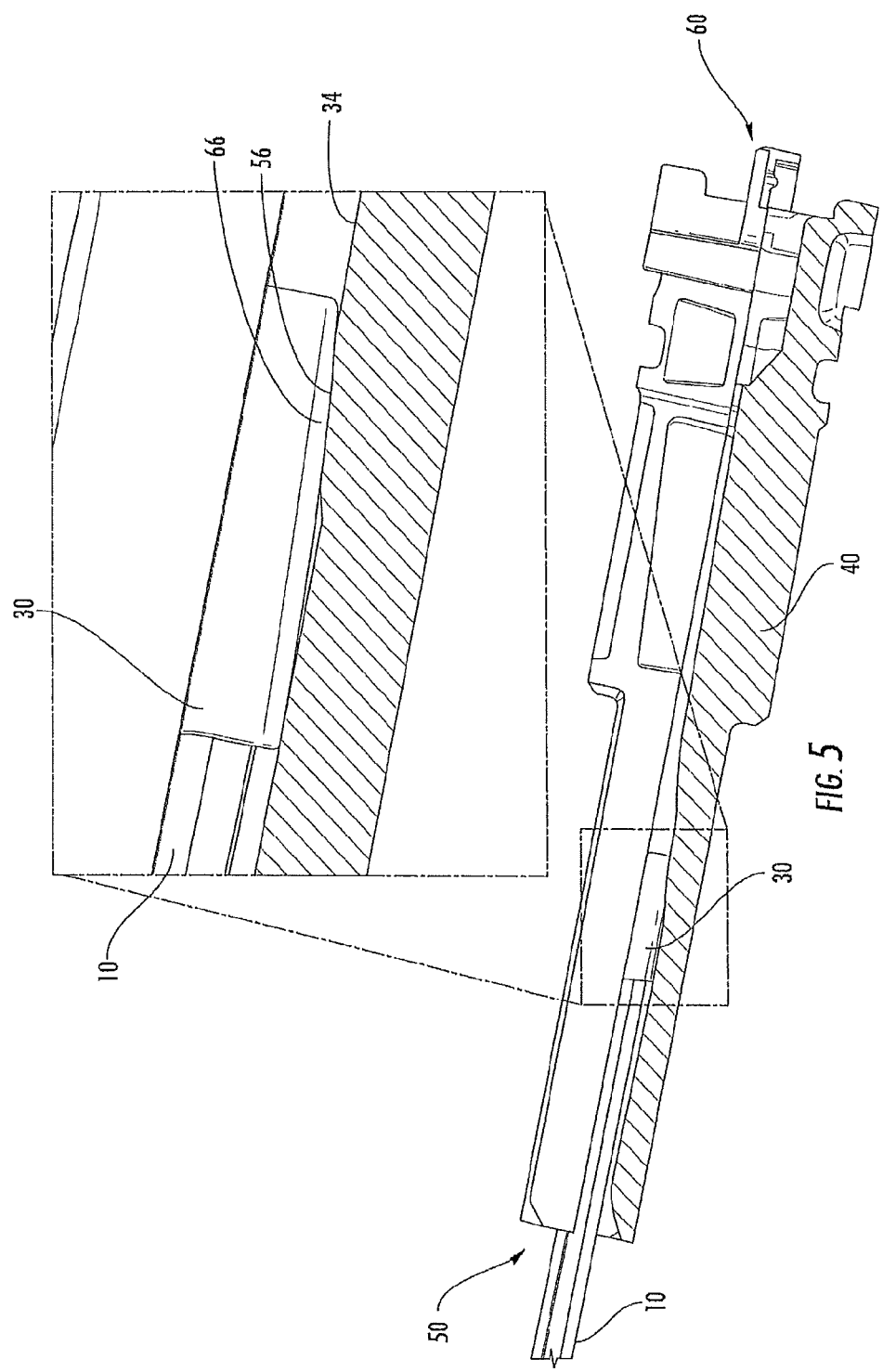

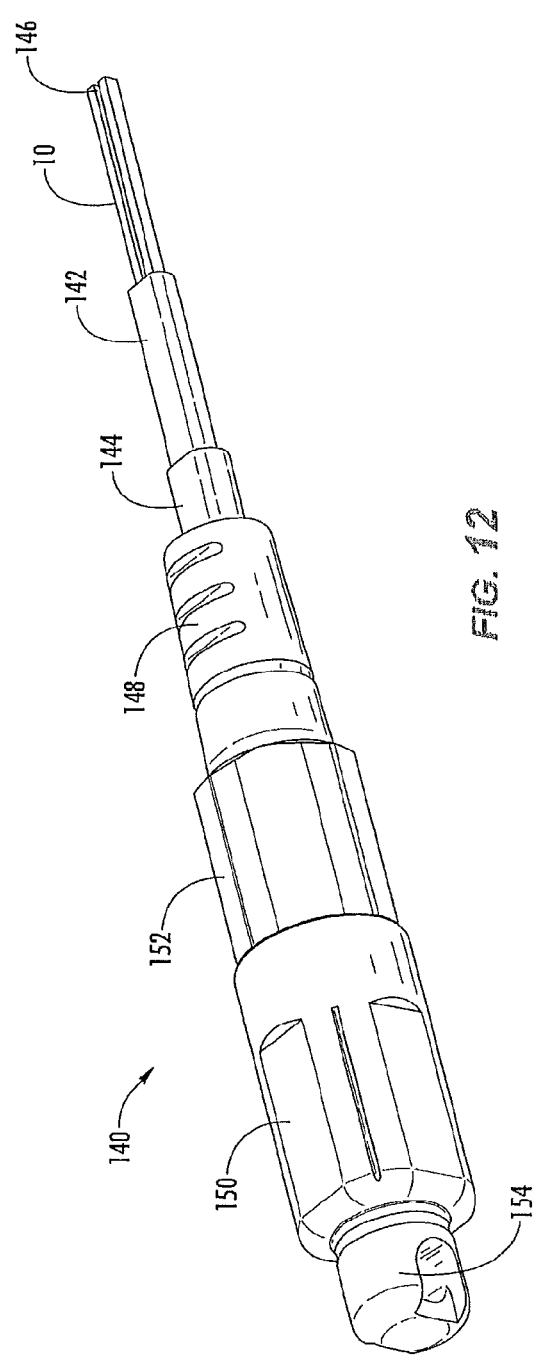

FIBER OPTIC CABLE ASSEMBLIES FOR TERMINATING A FIBER OPTIC CABLE AND METHODS OF MAKING THE SAME

PRIORITY APPLICATION

This application is a continuation of International Application No. PCT/US2015/030060 filed on May, 11, 2015 which claims the benefit of priority to U.S. Provisional Application No. 61/991,974 filed on May 12, 2014, the content of both are relied upon and incorporated herein by reference in their entireties.

BACKGROUND

Optical fiber connectors are an integral part of optical fiber communication systems, and are used for terminating an optical transmission component such as an optical fiber of a fiber optic cable. Optical fiber connectors are widely used for providing a mating/unmating connection point in optical networks, connecting different optical fibers, and terminating optical fibers for optical connection with other devices, such as closures, multiports, optical transmitters, receivers, isolators, attenuators, amplifiers, power meters, and detectors. When terminating a fiber optic cable with a fiber optic connector, the fiber optic cable should be secured to the fiber optic connector in a suitable manner to withstand pulling and side-load forces that may be experienced during installation and use. Moreover, the termination process should be relatively quick, easy and cost-effective.

Fiber optic connectors may be designed for terminating one specific fiber optic cable design and consequently may not be easily adapted for terminating other fiber optic cable designs. For instance, fiber optic cable designs may have different cross-sectional shapes, cross-sectional dimensions and/or materials, and a fiber optic connector intended for a specific cable design may not be easily adapted for others. Even different fiber optic cables of the same design can have manufacturing variations that render it difficult to terminate that cable design with certain connectors. Moreover, customers may want to use a specific fiber optic connector for their network, but in combination with a cable design that differs from the cable designed for use with their favored connector.

SUMMARY

According to one embodiment, a method of terminating a cable comprises providing a cable having at least one optical transmission component, providing a retention body having an insertion end and a passage extending at least partially along a length of the retention body, preparing a first end of the cable, placing an interior seal component at the first end of the cable, inserting the first end of the cable and the interior seal component into the passage, and introducing a filler agent into the passage.

According to another embodiment, cable assembly is provided. The assembly includes a cable including at least one optical transmission component and a retention body. The retention body includes an insertion end and a passage extending from an insertion end at least partially along a length of the retention body. The assembly includes an interior seal component including an aperture. A first end of the cable is at the interior seal component. The interior seal component is located within the passage, and the cable extends out of the passage from the insertion end. The filler material can contact the interior seal component.

According to another embodiment, the interior seal component can be placed within the passage and the cable then inserted into the passage.

According to one aspect, the interior seal component can prevent the passage of filler agent into a portion of the passage between the interior seal component and second, front end of the retention body opposite the insertion end.

According to another aspect, the interior seal component can act to center, secure and/or otherwise position the cable in the retention body during termination. The interior seal component can also be configured to adapt various cable types and/or sizes for use in a specific retention body, or to adapt various retention body types to work with a specific cable.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4A is a perspective view of the interior seal component illustrating a cavity in which a cable end is seated.

FIG. 4B is another perspective view of the interior seal component illustrating the face of the interior seal component that is inserted into a retention body passage.

FIG. 5 is another cutaway, detailed view of a cable subassembly illustrating the passage in a retention body engaged with the interior seal component.

FIG. 12 illustrates a terminated or connectorized cable assembly terminated at a hardened fiber optic connector.

DETAILED DESCRIPTION

Figure 1:
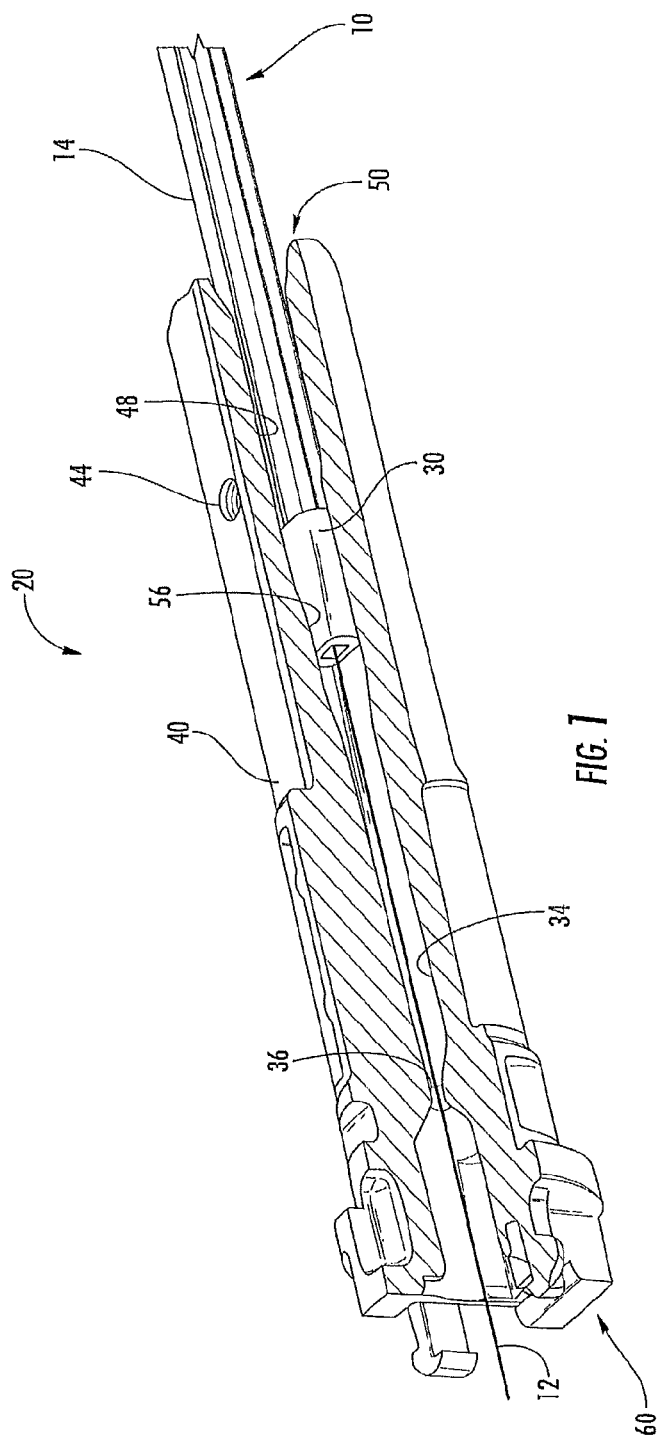
FIG. 1 is a perspective cutaway view illustrating a step in terminating a cable according to one embodiment.

FIG. 1 is a cutaway view illustrating a step in terminating a cable 10 according to a first embodiment. The cable 10 can be, for example, a fiber optical cable having, for example, one or more optical transmission components, such as one or more optical fibers 12. Other data, voice, etc. and other information transmitting media, such as metallic conductors, for example, can be included as an alternative to or in addition to optical transmission components. In the illustrated embodiment, the optical transmission components include a plurality of optical fibers 12. The cable 10 can also have, for example, a polymeric jacket 14, and one or more messenger or strength members 16 (shown in FIG. 8).

Figure 2:
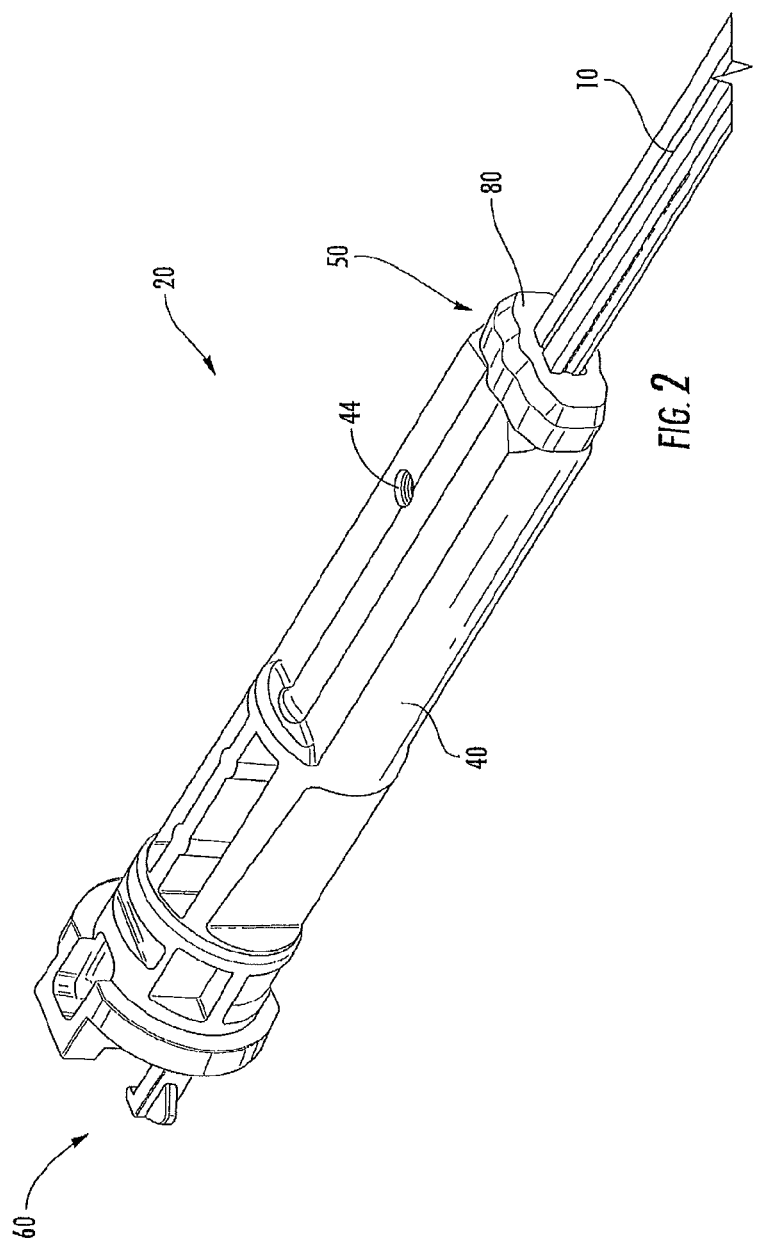
FIG. 2 is a perspective view of a subassembly of a terminated cable illustrating an end seal according to one embodiment.

FIG. 2 is a perspective view of a subassembly of a terminated cable 20 (also referred to as a 'connectorized' cable). The subassembly may ultimately be formed into a fiber optic cable assembly having a hardened fiber optic connector at its end (shown in FIG. 12). Referring to FIGS. 1 and 2, according to one aspect, an interior seal component 30 is placed at a first, insertion end of the cable 10 during the termination process, such as by inserting the cable end into the component 30. The interior seal component 30 at least partially closes the volume between the exterior of the cable 10 and an interior surface of a passage 34 of a tubular retention body 40. As shown in FIG. 1, because the interior seal component 30 surrounds the first end of the cable 10, the exterior dimensions (e.g., length, width) of the interior seal component 30 are larger than the those of the cable 10, and specifically, these relative sizes are cross-sections in a plane perpendicular to the longitudinal axis of the cable 10 and of the passage 34.

During the termination process, a filler or bonding material, such as a compound comprising a glue, epoxy, or some other bonding, and/or sealing substance is introduced into a section of the passage 34 that may be referred to as the bonding chamber 48. In general, the bonding chamber 48 is defined at one end by the seal created by end seal component 80 (discussed below) and at the other end by the seal created by the interior seal component 30. The filler agent may be introduced in fluid form through an opening in the retention body, shown as aperture 44, into the bonding chamber 48. Alternatively, the filler agent may be introduced from a first, cable insertion end 50 of the retention body. The filler agent acts to bond or secure a portion of the exterior of cable 10 to the inner surface of retention body 40 that defines the passage 34. As shown in FIG. 1, the aperture 44 extends radially outward from passage 34 through the retention body sidewall and through the outer surface of retention body 40 to provide an opening through which the filler agent may be introduced into passage 34.

As will be understood, the bonding that occurs within bonding chamber 48 can be sufficiently rigid so as to fix the position of cable 10 relative to retention body 40. Any suitable type of bonding agent may be used as a filler material. For example, the bonding agent may be radiation curable epoxy such as a visible light curable epoxy or an ultraviolet (UV) light curable epoxy, a heat curable epoxy, adhesive, resin, glue, or the like. If a radiation curable substance such as a light (e.g. UV) curable epoxy is used, then the retention body 40 should be translucent to appropriate wavelengths to allow the radiation to cure the radiation curable substance. By way of example, one suitable filler agent is a two-part heat curable epoxy available from Masterbond of Hackensack, N.J. under the tradename EP62-1TK. Another suitable filler agent having a thicker viscosity is available from Loctite of Mooresville, N.C. under the tradename Hysol-0151.

The bonding chamber 48 is located, along an axial direction of the retention body 40, between the interior seal component 30 and the first, cable insertion end 50 of the retention body 40. The first, insertion end 50 is the end of the retention body 40 through which the cable 10 is inserted during cable termination, and as shown in FIG. 2, an upstream section of the cable 10 extends out of and away from the retention body 40 through the insertion end 50. The interior seal component 30 may be configured to prevent and/or inhibit the passage of some, substantially all, or all of the fluid filler agent from entering into a narrowed passage section 56 of the body 40, or otherwise moving of the filler agent towards a second, front end 60 of the retention body 40. In one embodiment, the interior seal component 30 forms a fluid-tight seal within the passage 34 that prevents the filler agent from traversing past the seal within the passage 34. Adhesive filler agent flowing towards the second end 60 is not desirable because it can wholly or partially encapsulate an optical fiber and/or contact a ferrule, locking it in place and resulting in a nonfunctioning connector. Adhesive can also contaminate the rear (at the insertion end 50) of a connector, reducing the effectiveness of the strain relieving function of the connector. It is thus generally advantageous to retain the filler agent between the interior seal component 30 and the first end 50 during termination. The interior seal component 30 can be shaped and/or possess material properties (e.g., deformability, compliancy) so as to alleviate and/or obviate the need for shaving, cutting, shaping or otherwise altering the profile of the insertion end of the cable 10 so as to form the cable 10 into a shape that causes the cable 10 itself to seal the passage 34.

The term 'seal' is used in this application to indicate a component that inhibits but must not necessarily block all filler agent flow. For example, depending upon the viscosity of the filler agent, seal components may not need to fill the entire space between the cable 10 and the passage 34. A water-tight seal, for example, would be more than sufficient to block the flow of most contemplated filler agents. In some applications a seal may be sufficient for either end of the bonding chamber if it blocks most filler agent flow, but allows small amounts of filler agent to pass through the seals.

During termination, it is desirable that the cable 10 be relatively stable, immobile, and centered within the passage 34. The interior seal component 30 can alleviate and/or obviate the requirement of shaping the insertion end of the cable 10 so that the cable 10 is securely seated within the passage 34 of the retention body 40. The interior seal component 30 can be, for example, deformable so that it deforms to fit securely (e.g., an interference fit) over the end of a variety of cable sizes and types, and also so that its exterior deforms to fit against the interior surface of passage 34. It is also desirable for a retention body 40 to accommodate as many cable types and sizes as possible. According to the present embodiments, the seal component 30 can be sufficiently deformable so that a variety of cable types and sizes fit relatively snugly (e.g., interference fit) over the cable, as well as sufficiently deformable so that it is capable of seating snugly within a variety of retention bodies (e.g., a variety of passage sizes and configurations). According to one embodiment, a seal component can be part of an inventory of a family of seal components that are each sized to fit over a particular cable size and type, yet common to a specific retention body. This retention body family thus allows many cable types to be used with a specific retention body. Alternatively, a seal component can be part of an inventory of a family of seal components that are each sized to fit within one of variety of retention bodies, yet common to a specific cable size and type. This retention body family thus allows many retention bodies to be used with a cable type. Seal components according to the present embodiments thus provide a variety of options in alleviating or obviating the need for or the degree to which a cable end must be modified to be made suitable for use with various retention bodies.

Figure 3:
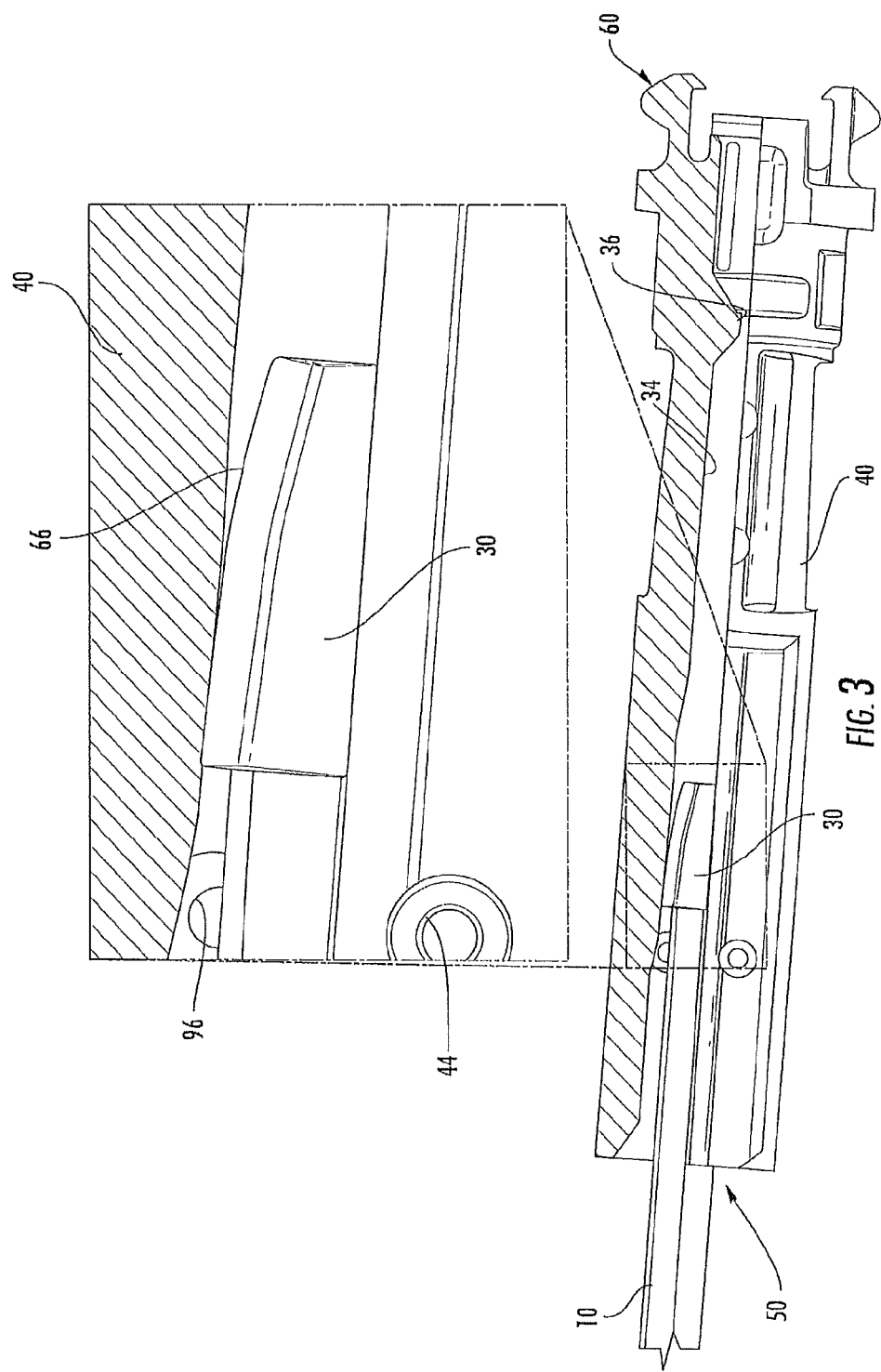
FIG. 3 is a cutaway, detailed view of subassembly illustrating an interior seal component at a cable end within a passage of a retention body.

FIG. 3 is a cutaway, detailed view of the partially terminated cable 20, before a filler agent is introduced into the retention body 40. The detailed view of the narrowed passage section 56 illustrates the reduction in cross-sectional area (e.g., the dimension perpendicular to the longitudinal axis) of the passage 34 in comparison with its cross-sectional area at the insertion end 50. The reduction of cross-sectional area can be realized, for example, by gradually reducing the height and width of the passage 34. The passage 34 may continue to narrow toward the front end 60 and reach a minimum cross-sectional area at a section 36 proximate to the front end 60. The optical transmission components 12 may extend through the passage 34 and pass through the section 36 for connection to a ferrule, as discussed below. The reducing cross-section of the passage 34 acts to center components during the formation of a cable assembly. The interior seal component 30 can have a tapered end 66 that is configured to abut or engage with the narrowed passage section 56 when the cable 10 has advanced a desired distance into the passage 34. The interior seal component 30 can have a shape that is complementary with the narrowed passage section 56 such that, when fully seated in the passage 34, it substantially or wholly closes the passage 34. The interior seal component 30 can, for example, form a fluid-tight seal that limits or prevents filler agent traversing past the seal, as well as securely seating the cable 10 in the retention body 40. The seal need not necessarily be fluid-tight, and when inserted the desired distance in the retention body 40, at the locations where the seal component engages the passage 34, the seal component 30 can occupy at least 70 percent of a transverse (i.e., perpendicular to the long axis of the retention body 40) cross-sectional passage area between the cable 10 and the passage 34 wall. According to another embodiment, the interior seal component 30 can occupy at least 90 percent, and further at least 95 percent of the cross-sectional area between the cable 10 and the passage 34 interior surface.

FIGS. 4A and 4B are perspective views of the interior seal component 30. The interior seal component 30 comprises a cavity 70 configured to receive an insertion end of the cable 10, and an aperture 72 through which, for example, optical transmission components can pass toward the front end 60 of the retention body 40. The cavity 70 is defined by an inner surface 74. In some embodiments, a portion of the inner surface 74 engages a portion of the exterior surface of the cable 10 when the interior seal component is mounted to the cable 10. The interior seal component 30 can be coupled to the cable 10 via, for example, an interference fit. The cavity 70 can be configured to, for example, fit a specific cable size and type, or configured to receive a variety of cable sizes and types. Referring also to FIG. 3, the interior seal component 30 can be formed from a relatively compressible material in order to enhance the seal with the passage 34, and in some such embodiments, the interior seal component 30 compresses forming an interference fit with the inner surface of the passage 34. The interior seal component 30 can be, for example, a pre-formed, molded part, that can be manually inserted by hand onto an end of the cable 10 prior to insertion into the passage 34. Alternatively, the interior seal component 30 may be inserted into the passage 34, and the cable 10 can subsequently be seated in the seal component as the cable end is inserted into the retention body 40.

FIG. 5 is another cutaway, detailed view of a step in cable termination. FIG. 5 illustrates deformation of the exterior of the interior seal component 30 as its tapered end 66 is pressed into the narrowed section 56 of the passage 34. The interior seal component 30 can be inserted into the passage 34 so that it deforms (e.g., under compression) and resulting in, for example, at least one percent reduction of its cross-sectional area at least one cross-section of the seal when it is seated within the passage 34. According to another embodiment, the seal component 30 can be inserted so that it is compressed resulting in at least a three percent reduction in its cross-sectional area at least one cross-section of the seal. According to one embodiment, the cavity 70 may have four substantially planar surfaces with projections 76 extending inwardly from the upper and lower surfaces so as to conform to one typical drop cable geometry.

Figure 6:
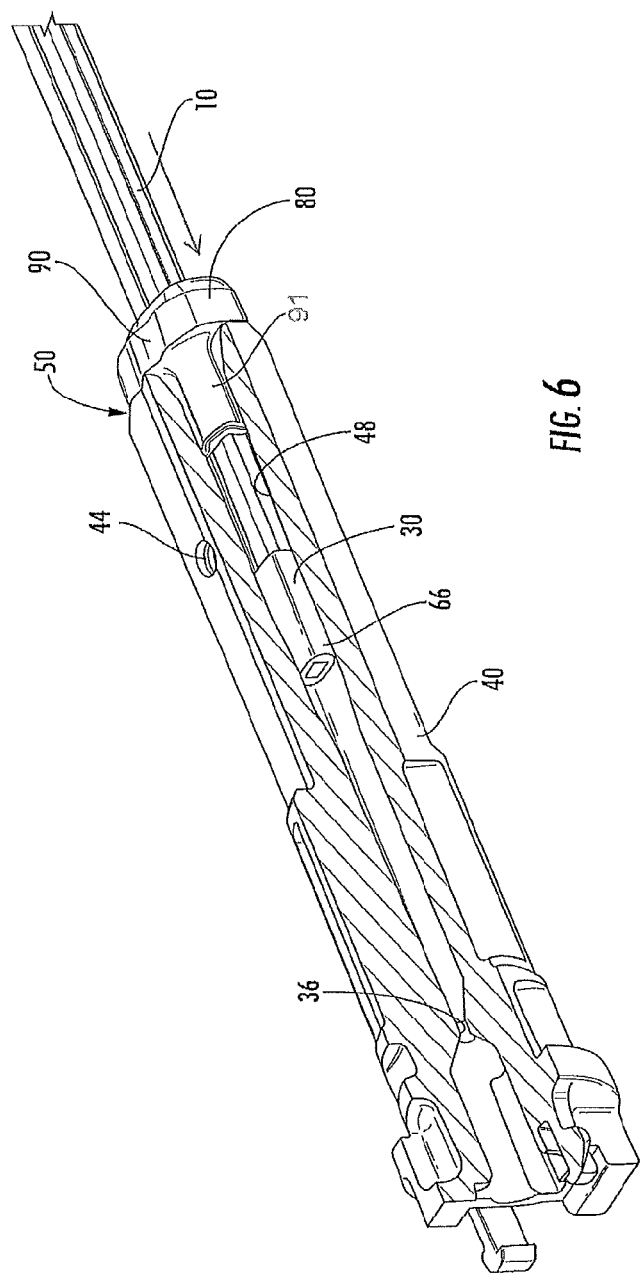
FIG. 6 is a perspective cutaway view of a subassembly of a terminated cable including an end seal at the insertion end of the retention body.
Figure 7:
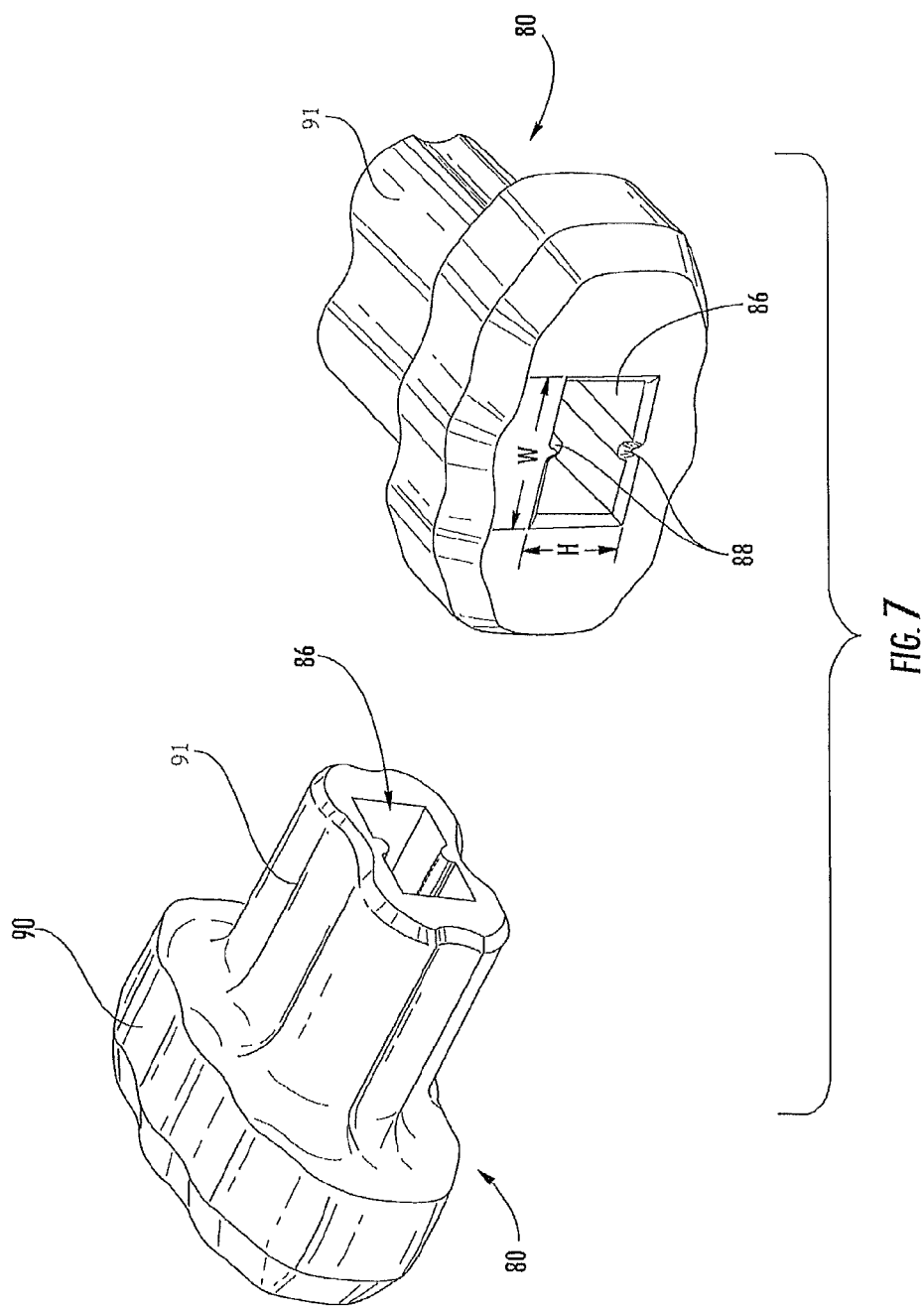
FIG. 7 illustrates perspective views of the end seal.

FIG. 6 is a perspective view of the cable 10 and retention body 40 ready for introduction of filler agent (not shown) into the bonding chamber 48. According to one embodiment, an end seal component 80 can be placed at the first end 50 of the retention body 40. The end seal component 80 may be included to substantially block and/or inhibit the filler agent from flowing from the bonding chamber 48 out of the insertion end 50 of the retention body 40 during termination. FIG. 7 illustrates perspective views of the end seal component 80. Referring to FIG. 7, the end seal component 80 includes an opening, shown as a through-hole aperture 86, configured to receive the cable 10. In various embodiments, the cable 10 extends through the end seal component 80 via the aperture 86. The aperture 86 can be configured to accommodate a cable of particular cross-section so as to substantially prevent or inhibit the passage of filler agent between the cable jacket and the passage 34 during termination. The end seal component 80 may also be configured to accommodate a variety of cable types and sizes. In the exemplary embodiment, the aperture 86 is generally rectangular in cross-section, with a width W that is at least 20 percent greater than its height H. Projections 88 can extend inwardly from the upper and lower surfaces of the aperture 86 and may be configured to generally mate with centrally located grooves extending along a length of the cables of certain cross-section.

The end seal component 80 can include a flange section 90 that is configured to engage the insertion end 50 of the retention body 40 (the engagement position is shown in FIG. 6). In FIG. 6, the flange section 90 abuts the insertion end 50. An insertion section 91 of smaller cross-section than the flange section 90 extends from the flange section 90. As shown in FIG. 6, the insertion section 91 extends into the passage 34, and in one embodiment, the outer surface of the insertion section 91 engages and forms an interference fit with the inner surface defining the passage 34. The end seal component 80 can be deformable so as to form a secure seal between the passage 34 and the cable 10 at the first end 50. Thus, end seal component 80 forms a seal within passage 34 and/or at the interface with the insertion end 50 of the retention body 40. The seal at the end can be fluid-tight, for example, with respect to the filler agent, or sufficiently fluid-tight to prevent significant filler agent from passing out of the end of the retention body during termination. In this arrangement, the combination of the interior seal component 30 and the end seal component 80 define the opposing ends of the bonding chamber 48. In the illustrated embodiment, the aperture 44 through which filler agent is introduced is located between the opposing inner faces of the interior seal component 30 and the end seal component 80. If filler agent is to be introduced through the insertion end 50 as opposed to through the aperture 44, the end seal component 80 would be slid along the cable 10 and 80 seated in the passage 34 after introducing the filler agent.

A method of terminating a cable will now be discussed with reference to FIGS. 1-12. A cable 10 having at least one optical transmission component, shown as one or more optical fibers 12, is provided. The insertion end of the cable 10 is moved through the aperture 86 of the end seal component 80 (shown in FIG. 7) a sufficient distance from the cable end to allow for further operations on the end of the cable 10. The insertion section 91 of the component 80 faces toward the insertion end of the cable 10.

Figure 8:
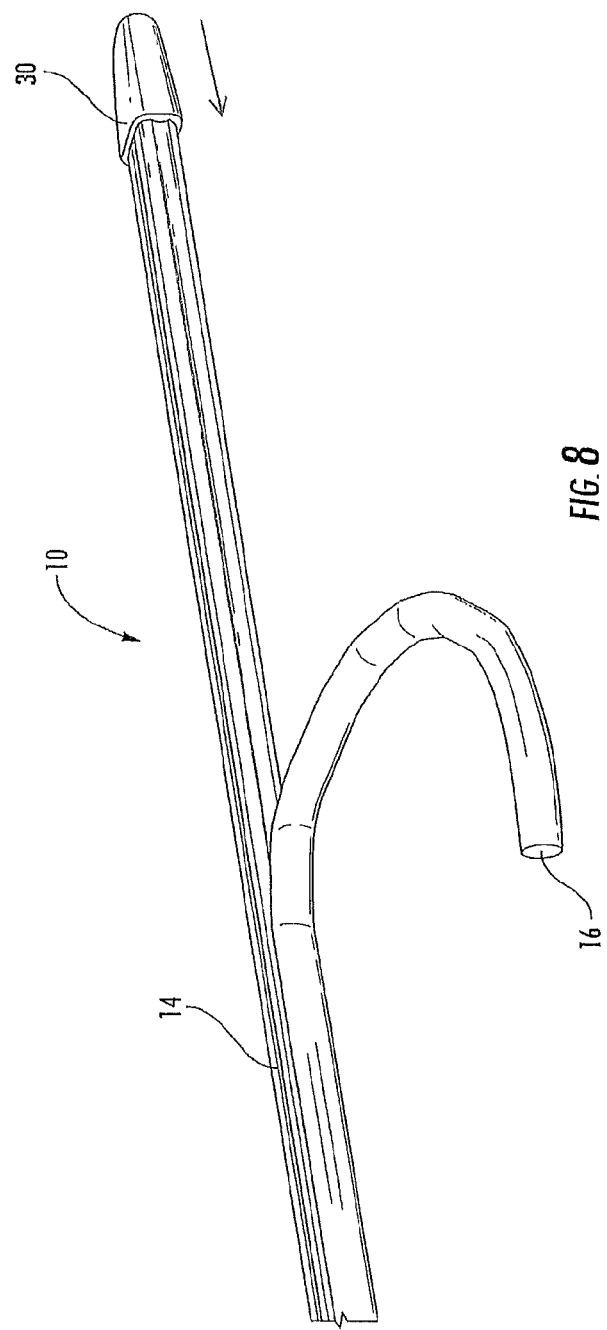
FIG. 8 illustrates a step in the termination process in which the interior seal component is placed on a first end of the cable.

Referring to FIG. 8, the first end of the cable 10 is then prepared for termination by removing all or a portion of the cable jacket 14 at the insertion end of the cable 10 to expose the optical transmission component(s) (e.g., a coated optical fiber(s)). One or more messenger wires or strength members 16 can be cut away from a specified length at the insertion end of the cable. The end seal component 80 is not visible in FIG. 8.

The interior seal component 30 is then placed at the prepared, insertion end of the cable 10, such as by mounting the interior seal component 30 on the cable 10 by pressing the cable into the cavity 70. If optical transmission components are included in the cable 10, they can be arranged so that they pass through the aperture 72 in the interior seal component 30. In this type of arrangement, the optical transmission components of cable 10 extend through the interior seal component 30 and into the region of the passage 34 between the interior seal component 30 and the second end 60. The exposed section of optical transmission components may be long enough to extend through the entire retention body 40 and past the front end 60. In a specific embodiment, the exposed sections of optical transmission components extend from the front end 60 of the retention body 40 to interface with a ferrule as part of the connectorization process.

The cable 10, with the interior seal component 30 on its end, is inserted into the passage 34 and advanced a desired distance to assume the position shown in FIG. 6. For example, the cable 10 can be advanced until the interior seal component 30 abuts and forms a relatively tight engagement with the passage 34, such as at the narrowed passage section 56. The component 30 also serves to position, such as by centering, the cable 10 within the passage 34 which may facilitate alignment and coupling to the ferrule. The cable 10 and component 30 are now seated within the retention body 40.

Still referring to FIG. 6, the end seal component 80 is then pushed along the cable 10 until the insertion section 91 enters the passage 34 at the insertion end 50 of the retention body 40. The end seal component 80 can be pressed firmly into the passage 34 so as to form a good seal at the end of the passage 34. The end seal component 80 also serves to center the cable 10 within the passage 34.

With the interior seal component 30 engaged with and at least partially sealing the interior of the passage 34, and the end seal component 80 at least partially sealing the insertion end 50 of the retention body, filler agent (not shown) is introduced into the passage 34 through the aperture 44. The filler agent may be, for example, introduced in liquid form into the passage 34 under pressure, such as by injection through the aperture 44. A vent aperture 96 (shown in FIG. 3) relieves pressure in the chamber 48 to allow injection of the filler agent into the bonding chamber 48. The filler agent is allowed to cure, securing the cable 10, the interior seal component 30, and the end seal component 80 to the retention body 40. The filler agent can be injected into the bonding chamber 48 so that it substantially fills the chamber, although filling less than the entire chamber space between the interior seal component 30 and the insertion end 50 may suffice to secure the cable 10 within the retention body 40.

Figure 9:
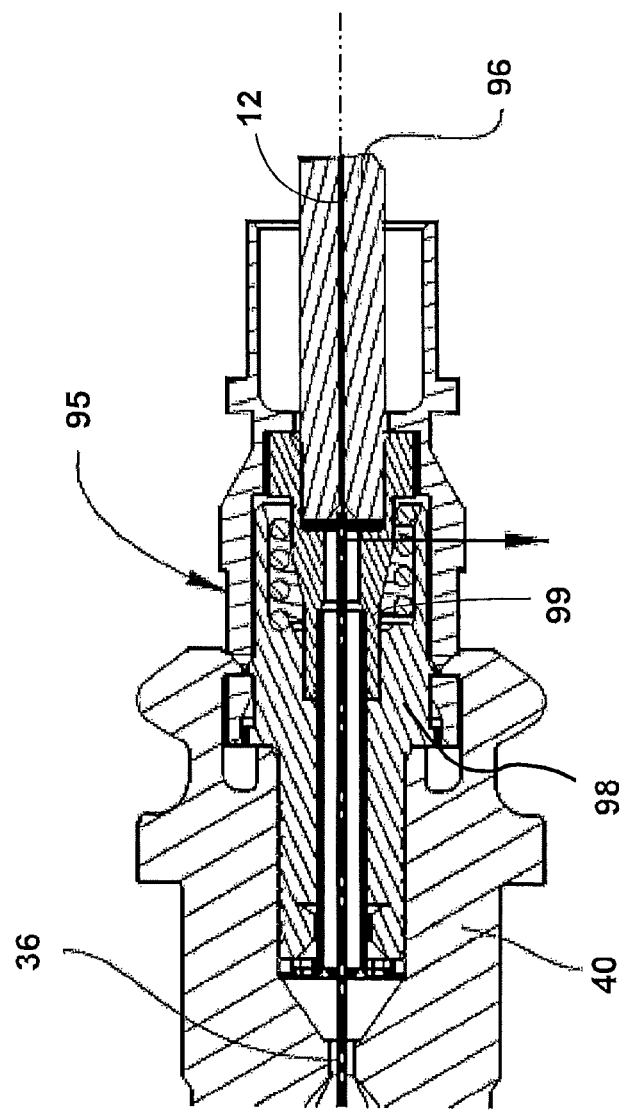
FIG. 9 illustrates coupling of a fiber optic subassembly to the retention body.

Referring to FIG. 9, the second, or front end 60 of the retention body 40, including the optical transmission component 12, is coupled to a fiber optic subassembly 95. The fiber optic subassembly 95 includes a ferrule 96 and a housing 98 that houses and supports a ferrule holder 99. The fiber optic subassembly may also include a spring for biasing the ferrule forward. Fiber optic subassembly 95 may be any suitable configuration type such as a SC-type or LC-type, but other types of fiber optic connector subassemblies are possible. The optical fiber 12 is securely retained inside ferrule 96 for inhibiting the effect of changes in optical fiber 12 length or misalignment issues when fiber optic cable 10 undergoes stress (e.g., compression, tension, side-load, etc.). During assembly, fiber optic subassembly 95 can be attached to the retention body 40, such as by snap-fitting with interlocking fingers disposed on opposite sides of retention body 40. U.S. Pat. No. 8,272,792 illustrates an exemplary process for coupling a fiber optic cable subassembly to a retention body, the contents of which are hereby incorporated by reference.

Figure 10:
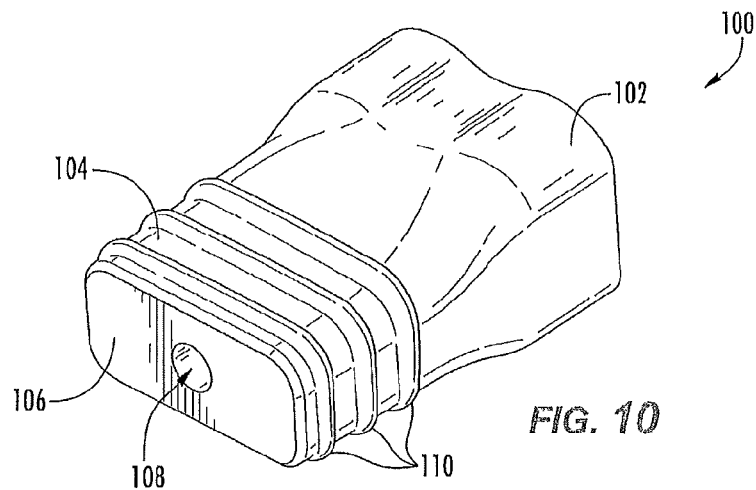
FIG. 10 is a perspective view of an interior seal component according to another embodiment.
Figure 11:
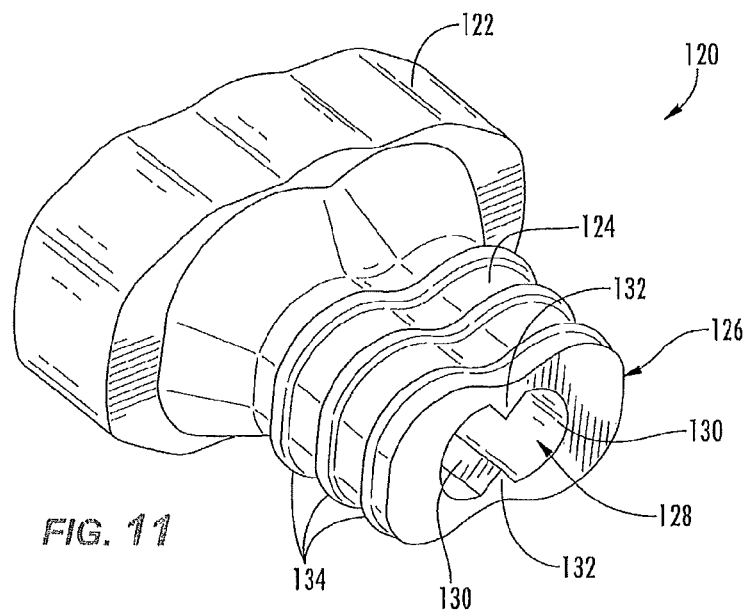
FIG. 11 is a perspective view of an end seal according to another embodiment.

Referring generally to FIGS. 10 and 11, an embodiment of an interior seal component, shown as interior seal component 100, and an embodiment of an end seal component, shown as end seal component 120, are shown. In general, the interior seal component 100 is substantially the same as the interior seal component 30 except as discussed herein, and the end seal component 120 is substantially the same as the end seal component 80 except as discussed herein.

The interior seal component 100 includes an expanded body portion 102 having a cavity that is configured and sized to receive the insertion end of the cable 10 and a reduced size section 104 that defines the front or leading surface 106 of interior seal component 100. In the embodiment shown, a cavity of the interior seal component 100 terminates in a substantially circular aperture 108 formed through the front surface 106. In general, the aperture 108 is shaped and sized to allow an optical transmission component of the cable 10, such as optical fiber 12, to extend out of the interior seal component 100 toward the second end 60 of the retention body 40.

The interior seal component 100 includes one or more sealing ribs, shown as sealing ribs 110, extending from reduced size section 104. In the embodiment shown, the sealing ribs 110 extend radially outward from the reduced size section 104 and also extend completely around the perimeter of reduced size section 104. In the specific embodiment shown, the sealing ribs 110 are substantially parallel to each other and are positioned substantially perpendicular to a longitudinal axis of the interior seal component 100. In general, the outer dimensions of the sealing ribs 110 are sized to engage and seal against the inner surface of the passage 34. Sealing ribs 110 are formed from a compliant deformable material that can deform as the interior seal component 100 is inserted into the passage 34 and can form a tight seal against the inner surface of the passage 34.

In various embodiments, the sealing ribs 110 may be integrally formed with the rest of the interior seal component 100. In other embodiments, the sealing ribs 110 may be separate components coupled around the reduced size section 104 and may be made from a material that is different from the rest of the interior seal component 100. In the embodiment shown, the interior seal component 100 includes three sealing ribs 110, but the interior seal component 100 may include any other numbers of ribs (e.g., 1, 2, 4, 8, 10, etc.) suitable to form a seal with the shape of a particular retention body 40.

Referring to FIG. 11, the end seal component 120 includes a flange section 122 and a reduced sized insertion section 124. The reduced sized insertion section 124 includes a rear or insertion face 126, and the interior channel of the end seal component 120 terminates in an opening 128 defined in the insertion face 126. In the embodiment shown, the interior channel and opening 128 are shaped to conform to the outer surface of the cable 10, and in the particular embodiment shown, opening 128 includes two semi-circular lobes 130 separated by upper and lower centrally located longitudinal ridges 132.

The end seal component 120 includes one or more sealing ribs, shown as sealing ribs 134, extending from the insertion section 124. In the embodiment shown, the sealing ribs 134 extend radially outward from the insertion section 124 and also extend completely around the perimeter of insertion section 124. In the specific embodiment shown, the sealing ribs 134 of insertion section 124 are substantially parallel to each other and are positioned substantially perpendicular to a longitudinal axis of the end seal component 120. In general, the outer dimensions of the sealing ribs 134 are sized to engage and seal against the inner surface of the passage 34. Sealing ribs 134 are formed from a compliant deformable material that deforms as the end seal component 120 is inserted into the passage 34 forming a tight seal against the inner surface of the passage 34.

In various embodiments, the sealing ribs 134 may be integrally formed with the rest of the end seal component 120. In other embodiments, the sealing ribs 134 may be separate components coupled around the insertion section 124 and may be made from a material that is different from the rest of the end seal component 120. In the embodiment shown, the end seal component 120 includes three sealing ribs 134, but the end seal component 120 may include any other numbers of ribs (e.g., 1, 2, 4, 8, 10, etc.) suitable to form a seal with the shape of a particular retention body 40.

FIG. 12 is a perspective view of a completed, terminated cable assembly, shown as connectorized cable assembly 140. FIG. 12 shows a plurality of outer protective layers and other components that surround the terminated cable end. Thus, the retention body of the terminated cable, such as retention body 40, the ferrule and other components of the connectorized cable assembly are located within the protective structures shown in FIG. 12.

Cable assembly 140 includes a first heat shrink tube, shown as first heat shrink tubing 142, is the first layer attached to the outer surface of the cable 10 at the beginning of the connector assembly. A second heat shrink tube, shown as second heat shrink tubing 144, is attached to the outer surface of the first heat shrink tubing 142 and/or to the outer surface of the cable 10. In general, the first heat shrink tubing 142 and the second heat shrink tubing 144 are formed from a polymer material that shrinks during heat to form a tight seal onto the outer surface of the cable 10.

As will be understood, the combination of the first heat shrink tubing 142 and the second heat shrink tubing 144 act to seal the insertion or upstream end of the connector assembly from water. In addition, the combination of the first heat shrink tubing 142 and the second heat shrink tubing 144 also acts to provide an increasing outer diameter onto which the adjacent components shown in FIG. 12 can be mounted. In general, the first heat shrink tubing 142 forms a water tight seal onto the outer surface of the cable 10 which prevents liquid or moisture from traveling down the length of cable 10 into the connector assembly at the end of the terminated cable. The thickness of the first heat shrink tubing 142 also increases the outermost diameter of the terminated cable assembly, which allows the large diameter, second heat shrink tubing 144 to shrink to form a water tight seal onto the outer surface of the first heat shrink tubing 142. In various embodiments, the two layers of heat shrink tubing disclosed here provides for water-tight sealing of the insertion or upstream side of the cable assembly while allowing the maximum outer diameter of the heat shrink sealing layers to be larger than may be easily achievable with a single layer of heat shrink tubing.

In various embodiments, first heat shrink tubing 142 is configured to provide for improved watertight sealing onto a contoured outer surface of the cable 10. As noted above, in various embodiments cable 10 includes one or more longitudinally extending grooves 146 on the upper surface of the cable 10 and may also include a corresponding longitudinal groove located on the lower surface of cable 10. In such embodiments, the inner surface of heat shrink tubing 142 may be defined by a layer of meltable adhesive material. In such embodiments, when heat is applied to shrink first heat shrink tubing 142 the inner layer of meltable adhesive melts and flows into the longitudinal grooves of the cable 10. When the meltable adhesive solidifies the adhesive has closely conformed to the contours of the outer surface of cable 10 and has filled the longitudinal grooves facilitating the formation of the watertight seal.

In various embodiments, heat shrink tubing 142 and 144 may be installed onto the cable 10 as part of a method of terminating a cable. In such methods, the cable 10 is passed through a central opening or channel of heat shrink tubing 142 after coupling of cable 10 to the retention body 40. Next, heat shrink tubing 142 is coupled to and sealed onto the outer surface of the cable 10 at a position upstream along the cable from retention body 40. Next, the cable 10 is passed through a central opening or channel of heat shrink tubing 144, and heat shrink tubing 144 is coupled and sealed onto the outer surface of the cable 10 and/or heat shrink tubing 142 also at a position upstream along the cable from retention body 40. In various embodiments, the seals formed by heat shrink tubing 142 and 144 are fluid-tight or water-tight seals. In various embodiments, sealing the first heat shrink tubing 142 onto the cable 10 includes melting the meltable adhesive located within heat shrink tubing 142 to conform to the outer surface of the cable 10 during heating.

Still referring to FIG. 12, a covering or boot, shown as boot 148, is coupled to the second heat shrink tube 144. In general, the boot 148 is formed from a flexible plastic material and controls flexibility at the cable connector and may also be configured to provide strain relief A cap, shown as dust cap 150, is located at the end of the terminated cable, and a coupling nut 152 is located between the boot 148 and the dust cap 150. In general, coupling nut 152 facilitates coupling to the appropriate network equipment (e.g., network service panel). Dust cap 150 protects the end of the fiber optic connector located within the dust cap 150. Dust cap 150 also includes a ring or loop, shown as attachment loop 154, located at the second or downstream end of dust cap 150. Loop 154 facilitates coupling to a tool, such as a pulling tool, that may be used during installation and deployment of the terminated cable.

As an alternative to placing a molded seal component 30 onto the end of the insertion end of the cable, the interior seal component may be a highly viscous liquid or a semi-solid sealing compound that is placed on the end of the cable prior to insertion into the retention body 40. In such embodiments, the interior sealing compound can be, for example, an adhesive material that is applied to the insertion end of the cable 10. In this embodiment, applying the interior sealing compound can replace the step of applying the interior seal component 30. The interior sealing compound can be allowed to cure after insertion into the retention body 40 such that a seal is formed between the adhesive injection aperture 44 and the second end 60 of the retention body 40. In some exemplary embodiments, the interior sealing compound may be sufficiently viscous (e.g., may have a putty-like consistency) so as to center and seal the cable within the retention body 40. When the filler agent is introduced into the bonding chamber 48, the interior sealing compound acts to limit or prevent the passage of filler agent past the seal toward the second, front end 60 of the retention body as it is injected into the passage 34 through the aperture 44.

According to another embodiment, the interior sealing component 30 and the end seal component 80 can be formed as a single component. The component can be configured for attached as a single unit to the cable 10, and configured to seal both the interior of the retention body 40 and its end. The end seal and interior seal component could be connected by, for example, a web matrix, longitudinally extending strips of material, or other means.

In the embodiments discussed herein, it is desirable to retain the filler agent within the passage 34. It is not necessary, however, to form a perfect seal at the interior and exterior seal components. It may be sufficient, for example, if less than five percent of the filler agent introduced into the retention body 40 moves out of the bonding chamber toward the front end of the retention body 40. According to another embodiment, it may be sufficient that at least 90 percent of the filler agent introduced into the retention body is maintained between the end seal component and the interior seal component.

The interior seal components disclosed herein can be made from deformable materials of sufficient rigidity to hold the cable relatively securely within the retention body during termination. For example, urethanes or other deformable plastics can be used to form molded pieces to serve as the seal components. The end seal component can be formed from similar materials. In various embodiments, various components discussed herein, including the interior seal component and/or the end seal component, may be made from materials such as styrene butadiene rubber (SBR), liquid silicone rubber (LSR), and styrene ethylene butylene styrene (SEBS) block copolymers. One exemplary set of materials used to form the interior seal component and/or the end seal has a Shore hardness in the range of 20-50.

The strength members according to the present embodiments can be, for example, elongate rigid elements extending along the length of a cable. Examples of rigid strength components include dielectric rods, metallic rods, metallic wires and similar materials. In one embodiment, the strength members can be glass reinforced plastic (GRP) rods. Strength members can also include one or more tensile yarns extending along the length of a cable. In one embodiment, the strength members are aramid yarns, such as yarns available under the brand name KEVLAR®, disposed within or inside or the cable jacket.

The cable jackets disclosed herein can be generally described as 'polymeric.' In this specification, the terms "polymer" and "polymeric" indicate materials comprised primarily of extrudable polymer materials such as, for example, copolymers, but allows for the presence of non-polymer materials such as additives and fillers. An example of polymers suitable for use in cable jackets according to the present embodiments includes polyethylene.

The fiber optic cable 10 may be of any desired length. The upstream end fiber optic cable 10 comprising part of the cable assembly 140, which is not illustrated, may be, for example, connectorized as shown in the figures, may be a simple section of cable, or may be otherwise connected.

The retention body can be constructed from any relatively rigid material, such as plastics and metals. In the illustrated embodiment, the retention body is made from an engineering thermoplastic.

The seals according to the illustrated embodiments are shown as continuous tubular shapes without interruption or discontinuity in the tubular cross-sections of the seals. For ease of installation, a slit, for example, may be cut into the cross-sections so that a seal may be opened and inserted onto a cable exterior. Any interruption in the cross-section of a seal should be calibrated so as to allow the seal to achieve to a desired level of liquid seal to be obtained for the termination process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of terminating a cable, comprising:
providing a cable having at least one optical transmission component;
providing a retention body having an insertion end and a passage extending at least partially through a length of the retention body;
preparing a first end of the cable;
inserting the first end of the cable and an interior seal component into the passage so that the interior seal component is located at the first end of the cable; and
introducing a filler material into the passage, wherein the filler material is introduced as a liquid into the passage and is selected from the group consisting of epoxy, adhesive, resin, and glue.

2. The method of claim 1, further comprising, prior to inserting the first end of the cable and the interior seal component into the passage, placing the interior seal component at the first end of the cable.

3. The method of claim 2, further comprising coupling a fiber optic subassembly to the retention body, the fiber optic subassembly including a ferrule housing, and a ferrule for connection to the at least one optical transmission component.

4. The method of claim 2, wherein preparing the first end of the cable comprises removing at least a portion of a jacket of the cable, wherein removing at least a portion of the jacket at least partially exposes at least one optical transmission component of the cable.

5. The method of claim 4, wherein preparing the first end of the cable comprises removing at least a portion of a strength component of the cable, the strength component comprising a component selected from the group consisting of elongate metallic components, elongate glass-reinforced plastic components, and aramid fibers.

6. The method of claim 2, wherein placing an interior seal component at the first end of the cable comprises extending the at least one optical transmission component through an aperture in the interior seal component.

7. The method of claim 6, wherein the at least one optical transmission component is pulled manually through the aperture in the interior seal component, and the interior seal component is placed manually over the first end of the cable.

8. The method of claim 2, wherein the interior seal component has an exterior width that is larger than an exterior width of the cable, and wherein the interior seal component has an exterior height that is larger than an exterior height of the cable.

9. The method of claim 8, wherein inserting the first end of the cable and the interior seal component into the passage causes at least one of the width and height of the interior seal component to reduce by at least one percent where it contacts the passage.

10. The method of claim 2, wherein inserting the first end of the cable and the interior seal component into the passage causes the interior seal component to form a seal in the passage to prevent a substantial portion of filler material from passing between the interior seal component and an interior surface of the passage.

11. The method of claim 2, wherein the passage has a first cross-sectional area at the insertion end, and a second cross-sectional area at a narrowed section of the passage, the second cross-sectional area being smaller than the first cross-sectional area, and wherein inserting the first end of the cable and the interior seal component into the passage causes the interior seal component to abut an interior surface of the narrowed section of the passage.

12. The method of claim 2, wherein introducing the filler material into the passage comprises introducing the filler material through an aperture in the retention body, the aperture opening into the passage at a location between the interior seal component and the insertion end of the retention body.

13. The method of claim 12, wherein inserting the first end of the cable and the interior seal component into the passage causes at least one outwardly extending rib of the interior seal component to engage the passage.

14. The method of claim 2, wherein placing the interior seal component at the first end of the cable comprises inserting at least a portion of the first end of the cable in a cavity of the interior seal component.

15. The method of claim 14, further comprising placing an end seal component on the cable so that the cable extends through an aperture in the end seal component.

16. The method of claim 15, further comprising moving the end seal component to a position abutting the insertion end of the retention body to inhibit a flow of filler material from passing out of the retention body.

17. The method of claim 15, wherein the retention body is an elongate tubular body and the passage extends through at least half a length of the retention body.

18. The method of claim 15, wherein the retention body is an elongate tubular body and the passage extends through the full length of the retention body.

19. The method of claim 15, wherein the interior seal component is a molded piece and the first end of the cable forms an interference fit with the interior seal component.

20. The method of claim 15, wherein an outer surface of the interior seal component forms an interference fit with an interior surface of the passage.

21. The method of claim 15, wherein the retention body is made from a rigid thermoplastic.

22. The method of claim 21, wherein the interior seal component is a deformable component having a Shore hardness in the range of 20-50.

23. The method of claim 15, wherein the at least one optical transmission component includes an optical fiber having an end disposed within the ferrule.

24. The method of claim 1, further comprising:
passing the cable through a first tube;
placing the first tube onto an outer surface of the cable at a position upstream from the retention body along the cable; and
placing a second tube onto an outer surface of the first tube at a position upstream along the cable from the retention body.

* * * * *